United States Patent
Grünbauer et al.

(10) Patent No.: US 10,196,478 B2
(45) Date of Patent: Feb. 5, 2019

(54) COMPOSITION IN THE FORM OF A LIGNIN POLYOL, A METHOD FOR THE PRODUCTION THEREOF AND USE THEREOF

(71) Applicant: Stora Enso, OYJ, Helsinki (FI)

(72) Inventors: Henri J. M. Grünbauer, Amersfoort (NL); Dimitri Areskogh, Stockholm (SE)

(73) Assignee: Stora Enso OYJ, Helsinki (FI)

( * ) Notice: Subject to any disclaimer, the term of this patent is extended or adjusted under 35 U.S.C. 154(b) by 24 days.

(21) Appl. No.: 15/101,537

(22) PCT Filed: Dec. 3, 2014

(86) PCT No.: PCT/IB2014/066545
§ 371 (c)(1),
(2) Date: Jun. 3, 2016

(87) PCT Pub. No.: WO2015/083092
PCT Pub. Date: Jun. 11, 2015

(65) Prior Publication Data
US 2017/0002129 A1    Jan. 5, 2017

Related U.S. Application Data

(60) Provisional application No. 61/912,119, filed on Dec. 5, 2013.

(30) Foreign Application Priority Data

Jun. 19, 2014 (SE) ...................................... 1450776

(51) Int. Cl.
| | | |
|---|---|---|
| C08G 18/64 | (2006.01) | |
| C07G 1/00 | (2011.01) | |
| C08H 7/00 | (2011.01) | |
| C08L 97/00 | (2006.01) | |
| C08J 9/14 | (2006.01) | |
| C08G 101/00 | (2006.01) | |

(52) U.S. Cl.
CPC ........... *C08G 18/6492* (2013.01); *C07G 1/00* (2013.01); *C08H 6/00* (2013.01); *C08J 9/141* (2013.01); *C08L 97/005* (2013.01); *C08G 2101/00* (2013.01); *C08J 2203/14* (2013.01); *C08J 2375/04* (2013.01); *C08L 2201/02* (2013.01)

(58) Field of Classification Search
CPC .. C07G 1/00; C08G 18/6492; C08G 2101/00; C08H 6/00; C08J 9/141; C08J 2203/14; C08J 2375/04; C08L 97/005; C08L 2201/02
See application file for complete search history.

(56) References Cited

U.S. PATENT DOCUMENTS

| | | | |
|---|---|---|---|
| 3,654,194 A | | 4/1972 | Christian et al. |
| 3,672,817 A | | 6/1972 | Falkenhag et al. |
| 4,987,213 A | | 1/1991 | Hirose et al. |
| 5,230,814 A | * | 7/1993 | Naae ...................... C09K 8/584 |
| | | | 166/270.1 |
| 5,834,529 A | | 11/1998 | Reese et al. |

FOREIGN PATENT DOCUMENTS

| | | |
|---|---|---|
| DE | 19648724 | 5/1998 |
| JP | H06306090 | 11/1994 |
| SE | 455098 | 3/1986 |
| WO | 2013179251 | 12/2013 |
| WO | 2014044234 | 3/2014 |

OTHER PUBLICATIONS

International Search Report and Written Opinion issued by the International Search Authority for International Application No. PCT/IB2014/066545, dated Mar. 20, 2015.

* cited by examiner

*Primary Examiner* — John M Cooney
(74) *Attorney, Agent, or Firm* — Greer, Burns & Crain, Ltd.

(57) ABSTRACT

The present invention relates to a composition comprising a lignin polyol, a method for the manufacturing of said composition and use thereof in different application areas, such as in adhesives, binders, castings, foams (such as in rigid polyurethane and polyisocyanurate foams for thermal insulation and construction applications, semi-rigid, flexible, moulded, laminated, microcellular and viscoelastic polyurethane foams), fillers, glues, sealants, elastomers and rubbers. The present invention also relates to a method for the manufacturing of a foam and use of this foam.

7 Claims, 10 Drawing Sheets

Figure 1:
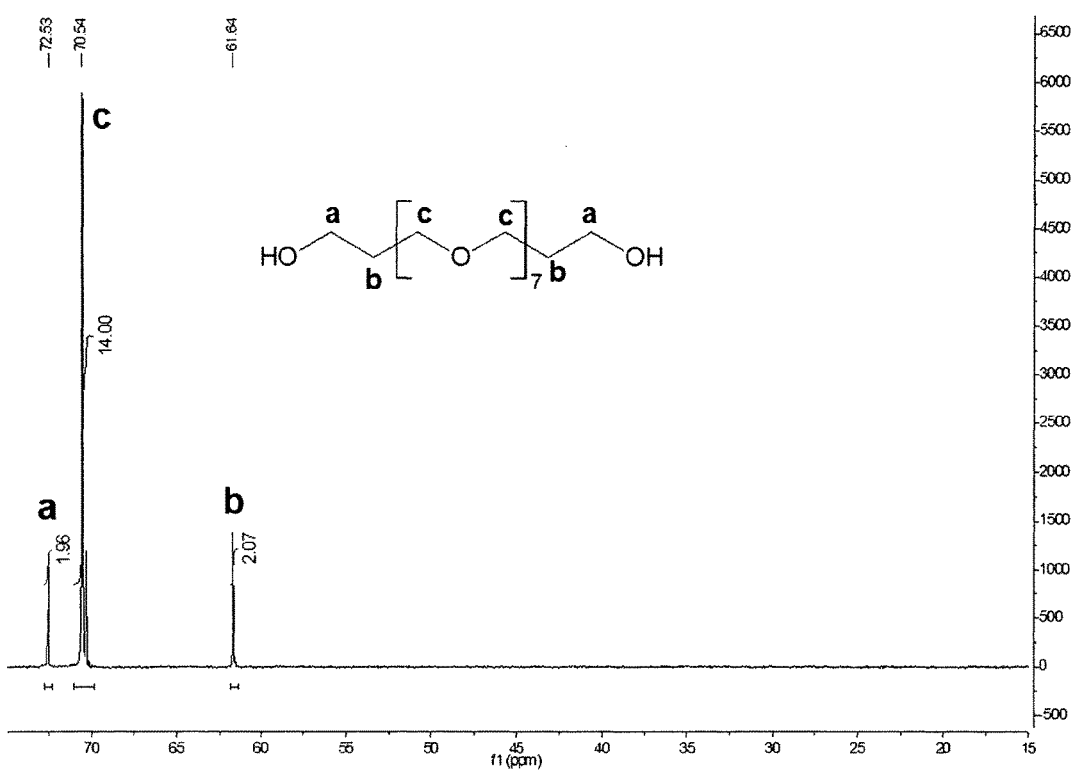

Figure 1: $^{13}$C-NMR spectrum of pure PEG400 dispersant from Example 1. Peak shifts are adjusted relative to the CDCl$_3$ solvent triplet centered at 77.1 ppm . Peak annotations have been conducted using standard $^{13}$C-NMR shift table available elsewhere.

Figure 2:
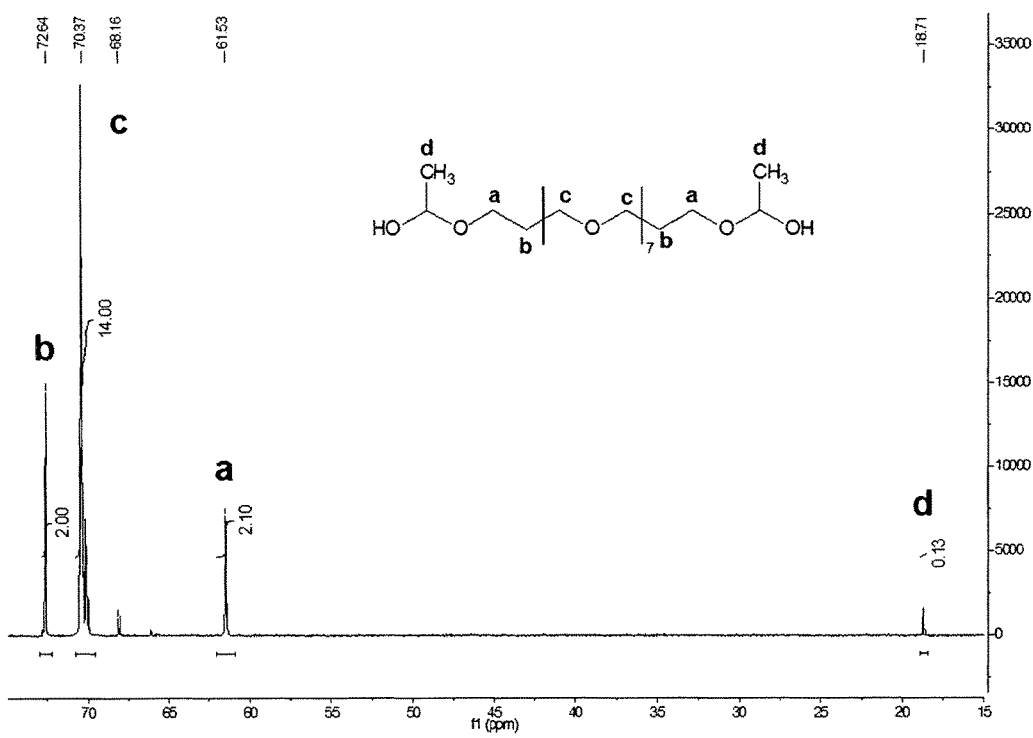

Figure 2: $^{13}$C-NMR spectrum of isolated PEG400 dispersant after polyol synthesis in Example 1. Peak shifts are adjusted relative to the CDCl$_3$ solvent triplet centered at 77.1 ppm . Peak annotations have been conducted using standard $^{13}$C-NMR shift table available elsewhere.

Figure 3:
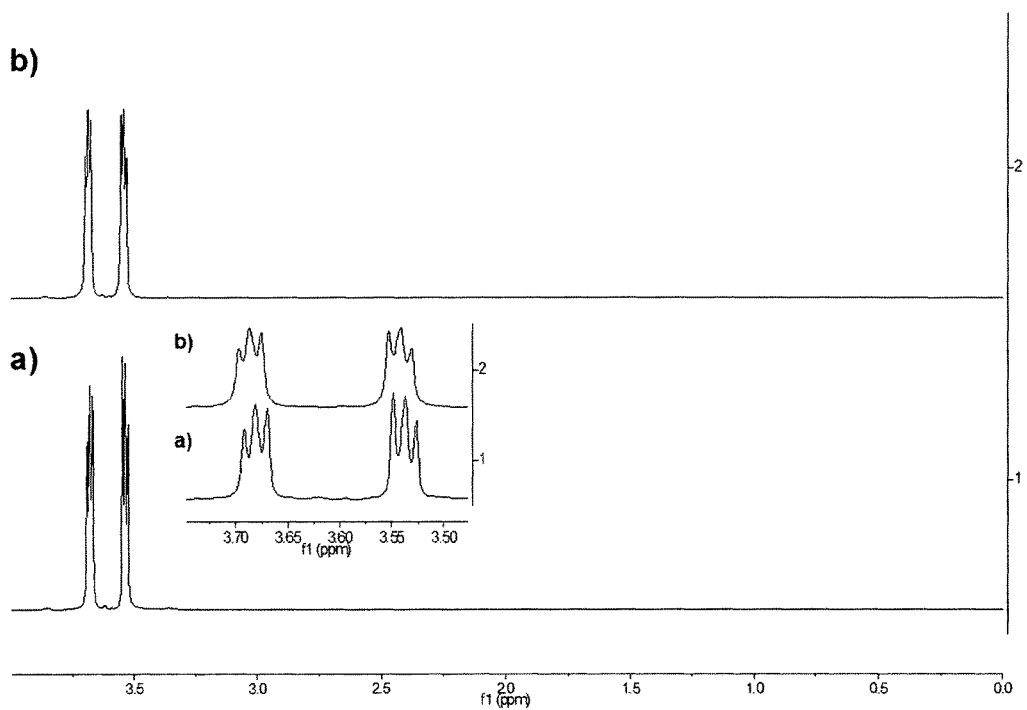

Figure 3: ¹H-NMR spectrum of pure (a) and isolated (b) diethylene glycol dispersant used in Example 2. Peak shifts are adjusted relative to the $CDCl_3$ solvent signlet at 7.2 ppm . Peak annotations have been conducted using standard ¹H-NMR shift table available elsewhere. The two spectra are expanded in the region 3.8 – 3.5 ppm to highlight the signal peak splitting pattern.

Figure 4:
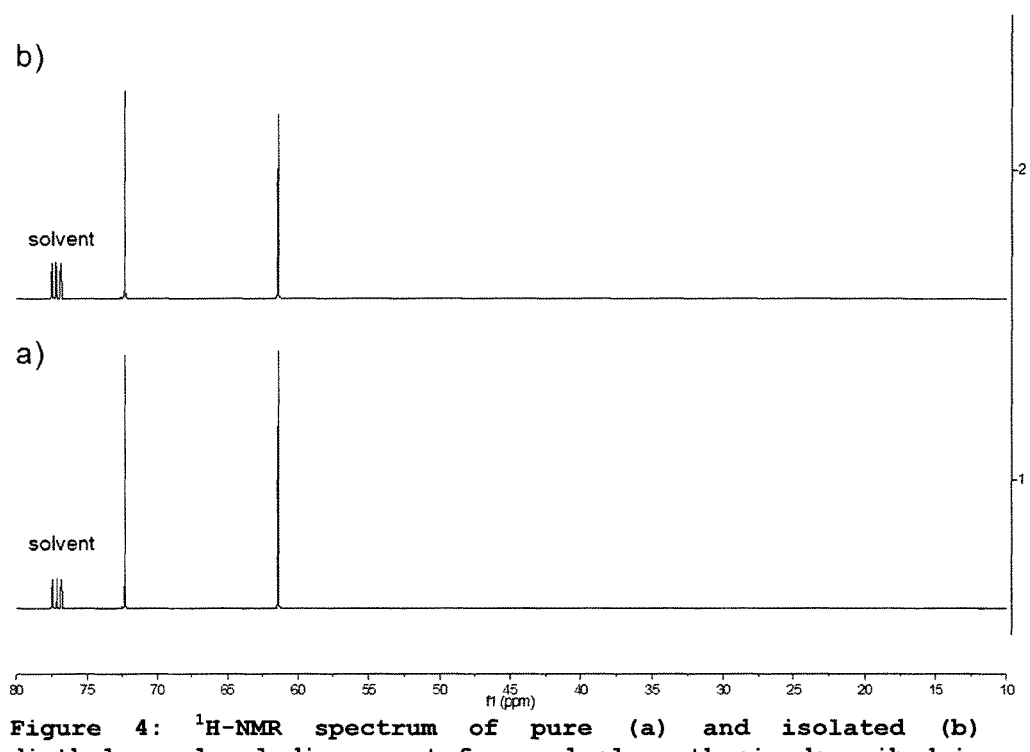

Figure 4: ¹H-NMR spectrum of pure (a) and isolated (b) diethylene glycol dispersant from polyol synthesis described in Example 2. Peak shifts are adjusted relative to the CDCl$_3$ solvent triplet centered around 77.1 ppm. Peak annotations have been conducted using standard ¹³C-NMR shift table available elsewhere.

Figure 5:
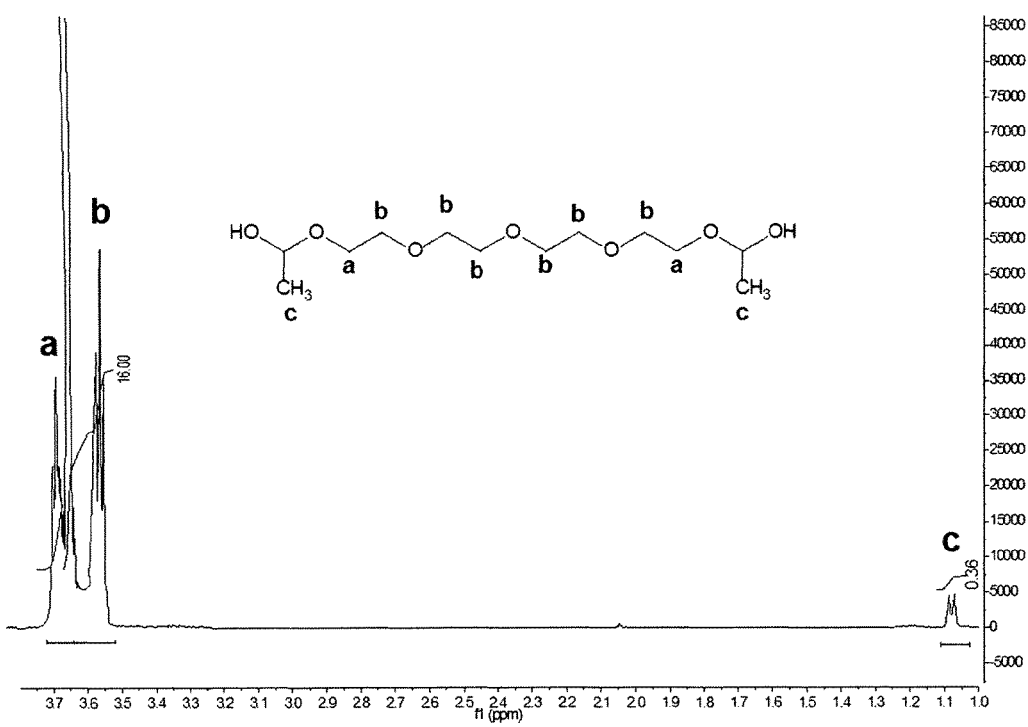

Figure 5: $^1$H-NMR spectrum of isolated tetraethylene glycol from polyol synthesis described in Example 3. Peak shifts are adjusted relative to the CDCl$_3$ solvent signlet at 7.28 ppm . Peak annotations have been conducted using standard $^1$H-NMR shift table available elsewhere.

Figure 6:
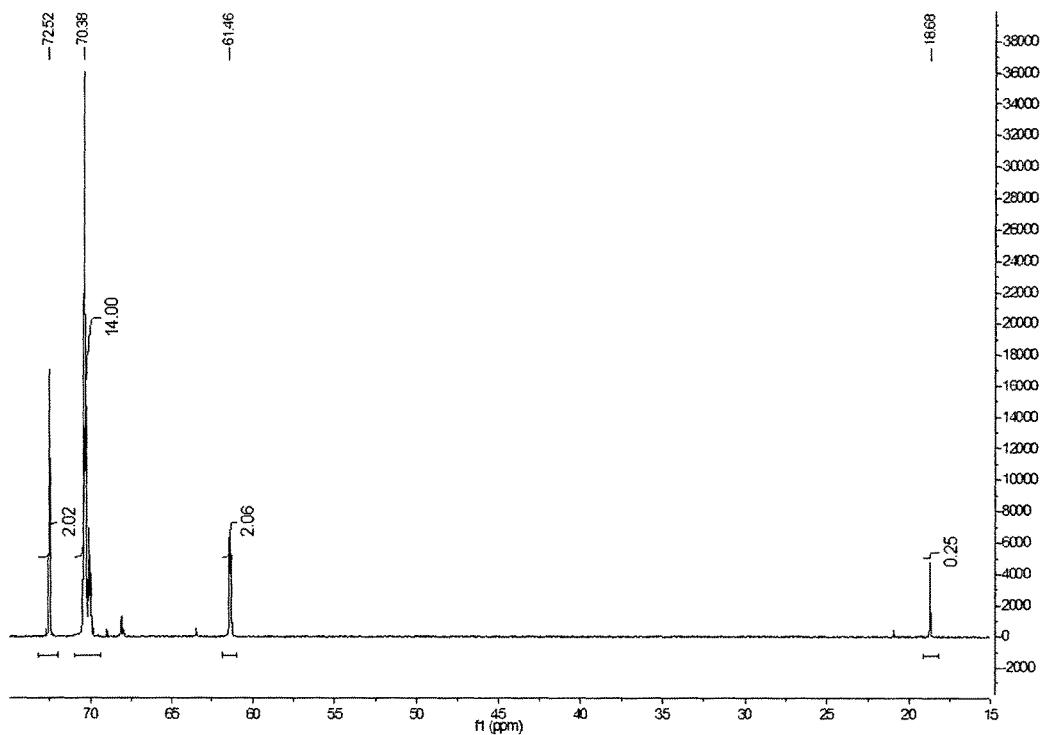

Figure 6: $^{13}$C-NMR spectrum of isolated PEG400 dispersant after polyol synthesis described in Example 6. Peak shifts are adjusted relative to the CDCl$_3$ solvent triplet at 77.1 ppm . Peak annotations have been conducted using standard $^{13}$C-NMR shift table available elsewhere.

Figure 7:
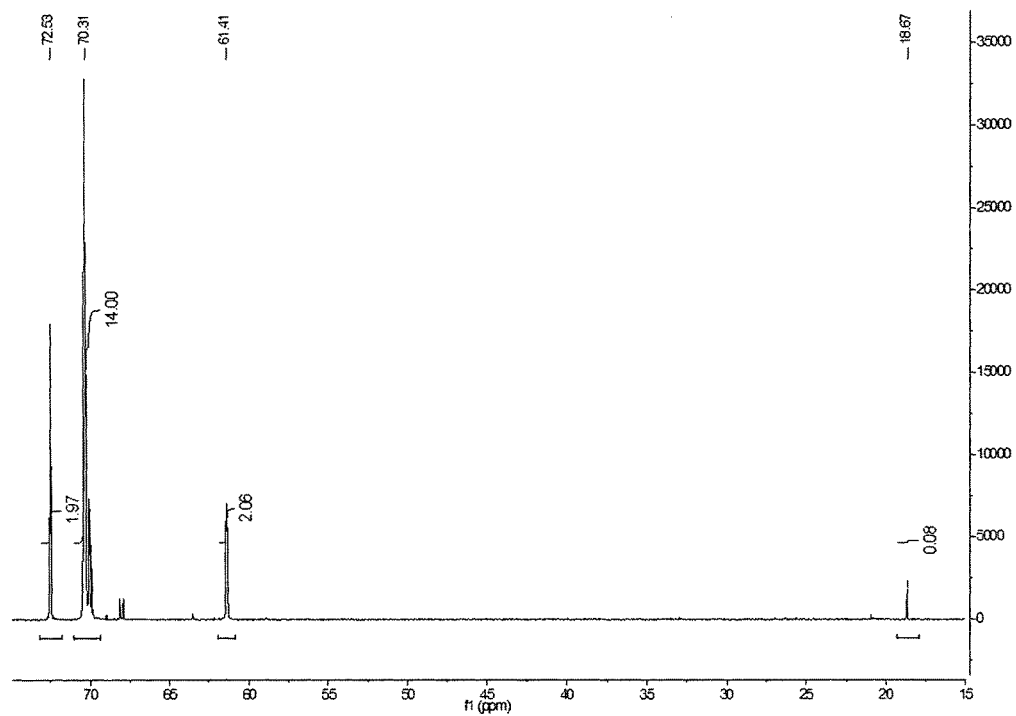

Figure 7: $^{13}$C-NMR spectrum of isolated PEG400 dispersant after polyol synthesis described in Example 7. Peak shifts are adjusted relative to the CDCl$_3$ solvent triplet at 77.1 ppm. Peak annotations have been conducted using standard $^{13}$C-NMR shift table available.

Figure 8:
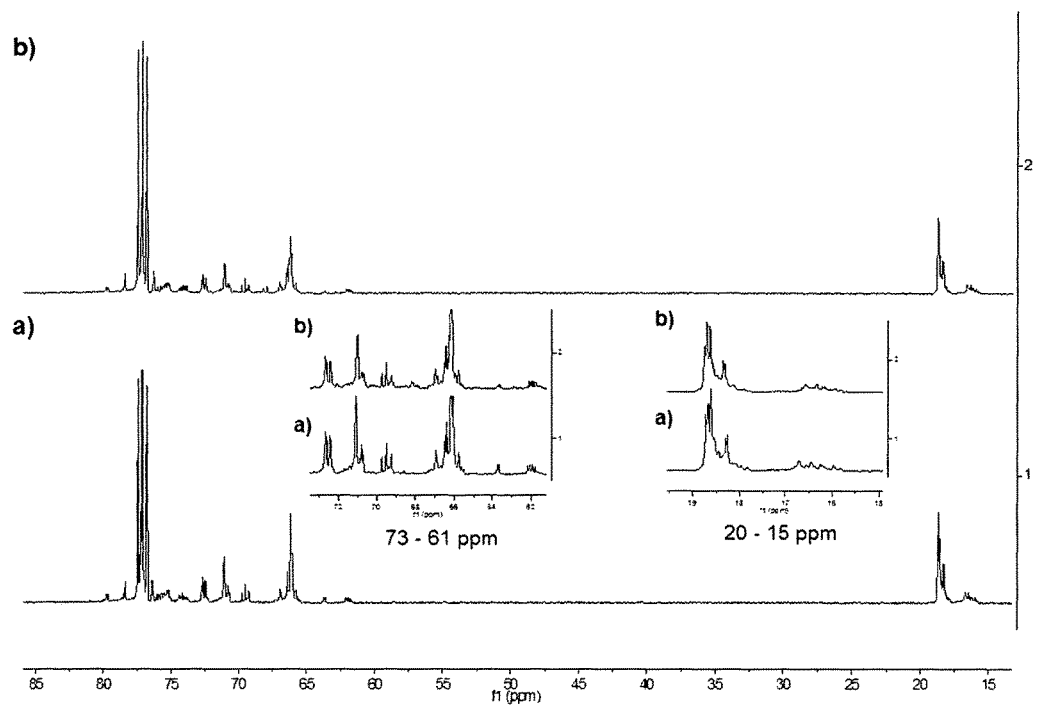

Figure 8: $^{13}$C-NMR spectrum of pure (a) and isolated (b) glycerol propoxylate dispersant from polyol synthesis described in Example 8. Peak shifts are adjusted relative to the CDCl$_3$ solvent triplet centered around 77.1 ppm. The spectra are expanded in the region 73-61 and 20-15 ppm to highlight the splitting pattern of backbone carbon signal peaks.

Figure 9:
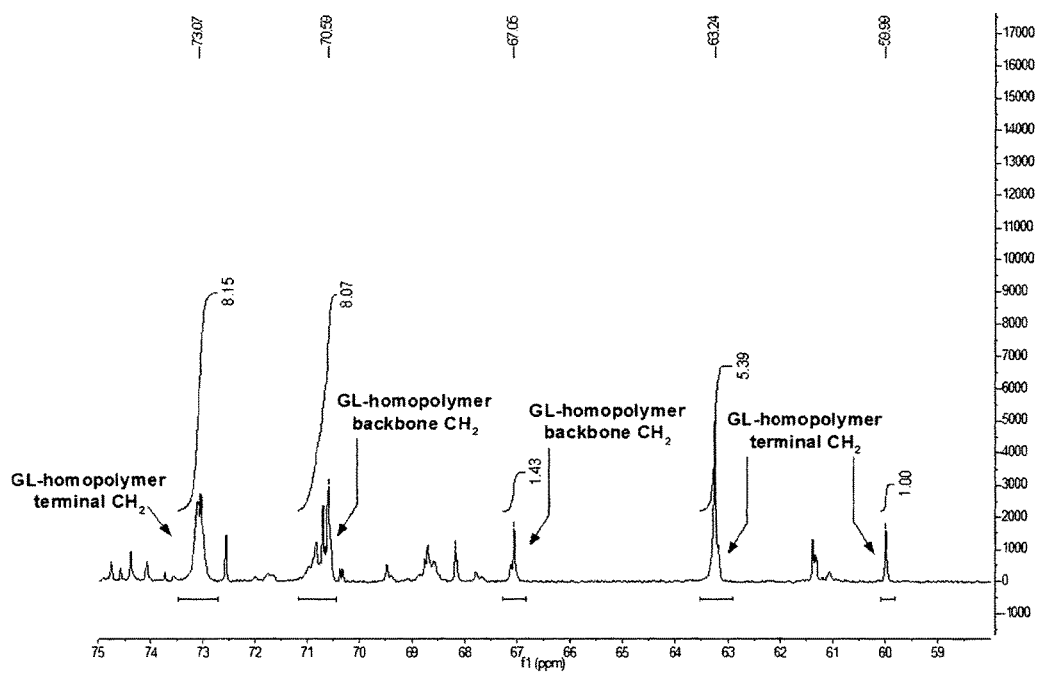

Figure 9: $^{13}$C-NMR spectrum of glycidol homopolymer isolated from a reaction of glycidol in the presence of KOH. Peak shifts are adjusted relative to the DMSO-d$_6$ solvent multiplet(7) centered around 39.5 ppm. Peak annotations have been conducted using standard $^{13}$C-NMR shift table available elsewhere.

Figure 10:
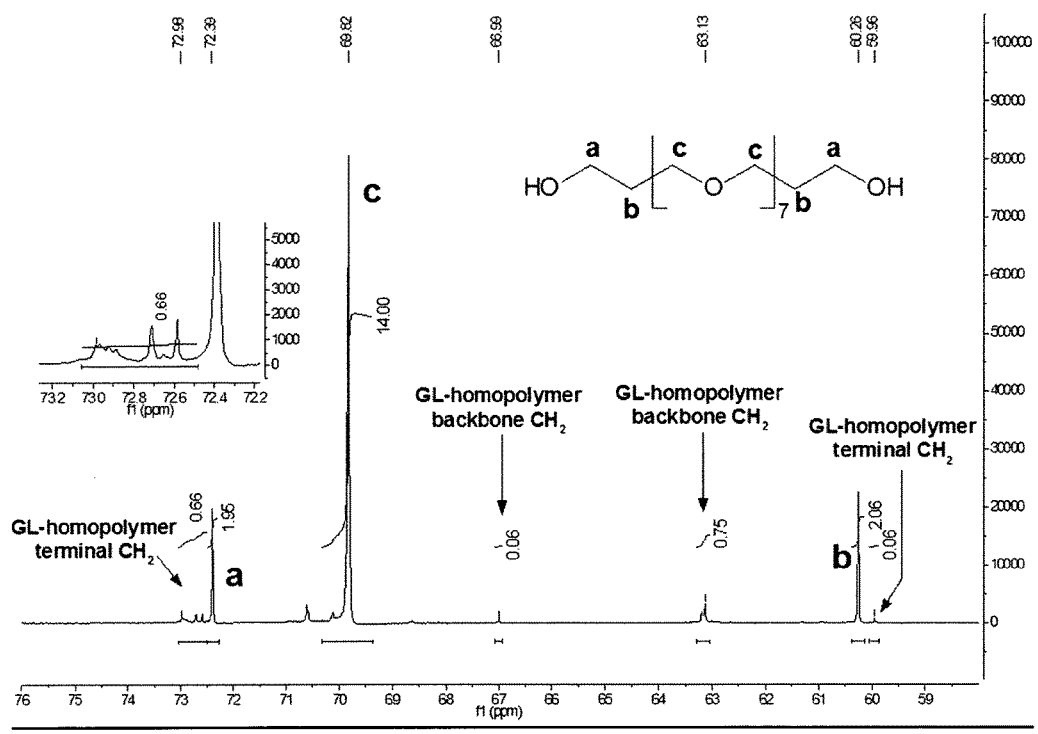

Figure 10: $^{13}$C-NMR spectrum of isolated dispersant polyol PEG400 from polyol synthesis described in Example 9. Peak shifts are adjusted relative to the DMSO-d$_6$ solvent multiplet(7) centered around 39.5 ppm. The spectrum is expanded in the region 73-72 to highlight the characteristics of the carbon signal peaks.

COMPOSITION IN THE FORM OF A LIGNIN POLYOL, A METHOD FOR THE PRODUCTION THEREOF AND USE THEREOF

This application is a U.S. National Phase under 35 U.S.C. § 371 of International Application No. PCT/IB2014/066545, filed Dec. 3, 2014, which claims priority under 35 U.S.C. §§ 119 and 365 to U.S. Provisional Application No. 61/912,119 filed Dec. 5, 2013 and Swedish Patent Application No. 1450776-8 filed Jun. 19, 2014.

FIELD OF INVENTION

The present invention relates to a composition comprising a lignin polyol, a method for the manufacturing of said composition and use thereof in different application areas, such as in adhesives, binders, castings, foams (such as in rigid polyurethane and polyisocyanurate foams for thermal insulation and construction applications, semi-rigid, flexible, moulded, laminated, microcellular and viscoelastic polyurethane foams), fillers, glues, sealants, elastomers and rubbers.

The present invention also relates to a method for the manufacturing of a foam and use of this foam.

BACKGROUND

The interest in utilization of lignin in various applications has steadily grown over the years with the main driving force to find a sustainable alternative to mineral oil-based products. An area where the intrinsic properties of lignin i.e. the existence of a cross-linked network, can be harnessed most efficiently is the utilization of lignin to reinforce a multitude of polymeric materials such as urethane-based networks and polymers.

In DE 19,548,350, DE 19,648,724, U.S. Pat. Nos. 4,918,167, 3,546,199, 3,654,194, WO 2013,113,462 as well as the set of publications by Glasser and co-workers [1-8] and more recently by Cateto et al. [9-10], Gandini et al. [11] Nadji et al. [12], Li et al. [13], Xue et al. [14], and Arshanitsa et al. [15, 16] alkoxylation of lignin has been attempted. However, these approaches so far encounter some serious drawbacks;
1) All scientific publications as well as all relevant patents report significant degrees of homopolymerization of propylene oxide under the reaction conditions applied [WO 2013,113,462]. As a consequence, the degree of process control for the polyol synthesis is severely reduced and the formulation latitude is more or less lost due to difficulties to assess how much homopolymer is formed.
2) At the reported reaction conditions, self-condensation of the lignin macromolecule structure is always present leaving non-soluble fractions in the resulting polyol [WO 2013,113,462]. This requires additional filtration step(s) in the polyol manufacturing process.

US 2,013,255,216 claims a modified lignin comprising phenolic groups masked with propylene oxide. However the claimed compositions are produced in aqueous environment which is severely limiting the application in the production of polymers, especially those polymers comprising water-reactive monomeric species such as urethanes.

In conclusion, none of the aforementioned publications and patents describes a satisfactory technology for producing lignin polyols.

A dispersion containing lignin is also disclosed in WO2013179251

Therefore there exists a need for a method to produce lignin polyols that are liquid, smell neutral, without homopolymers and/or precipates that require unwanted additional processing steps (such as filtration, extraction etc.).

SUMMARY OF INVENTION

The present invention solves one or more of the above problems, by providing according to a first aspect a composition in the form of a dispersion, comprising one or more dispersants, and alkoxylated lignin, preferably alkaline lignin, wherein said dispersants have a solubility parameter of from about 18 to about 30 $MPa^{1/2}$, an average functionality of dispersant or dispersant mixture between 2 and 6 isocyanate reactive groups per molecule, and a viscosity of the dispersant or dispersant mixture lower than 5 000 MPa·s at room temperature.

The present invention also provides according to a second aspect a method for manufacturing a composition, according to first aspect, comprising the following steps:
  i) dispersing a lignin in one or more dispersants,
  ii) adding a catalyst,
  iii) removal of excess water,
  iv) adding an alkoxide at a temperature of from 20 to 80° C., more preferably from 30 to 60° C. and most preferred from 40 to 50° C.,
  v) neutralizing the catalyst with an acid, and
  vi) optionally filtrating the polyol with a silicate compound, such as magnesium silicate, to remove traces of neutralized catalyst.

The present invention also provides according to a third aspect a composition in the form of a dispersion obtainable by a method according to the second aspect.

The present invention also provides according to a fourth aspect use of a composition according to any one of the first or third aspects for making foams, rubbers, adhesives, reactive fillers or for use as a filling agent.

The present invention also provides according to a fifth aspect a method for manufacturing a foam comprising the following steps:
  a) providing a composition according to any one of the first or third aspects,
  b) adding one or more additives such as catalysts, surfactants and/or flame retardants,
  c) optionally adding additional polyols and/or water,
  d) adding one or more blowing agents to said composition,
  e) mixing the composition obtained in step d) by stirring, high-shear mixing or impingement mixing with an isocyanate, such as polymeric MDI or an isocyanate prepolymer, and
  f) conveying the mixed composition of step into a mould or conveyor belt to provide a foam continuously or discontinuously.

The present invention also provides according to a sixth aspect a foam obtainable by the method according to the fifth aspect.

The present invention also provides according to a sixth aspect use of a foam according to the sixth aspect for thermal insulation and construction applications, semi-rigid, flexible, moulded, laminated, microcellular and viscoelastic polyurethane foams, fillers, glues, sealants, elastomers and rubbers.

The compostions and methods set out above yields liquid lignin polyols without precipitates and/or homopolymerized alkoxides that are producing excellent thermoset products when reacted with one or more suitable isocyanate(s) and/or isocyanate containing moieties, such as isocyanate prepolymers.

DETAILED DESCRIPTION OF THE INVENTION

It is intended throughout the present description that the expression "lignin" embraces any lignin which may be used for making dispersions. Preferably the lignin is an alkaline lignin. It may e.g. be a Kraft lignin. The lignin may preferably be obtained by using the process disclosed in WO 2006031175 (EP 1794363).

It is intended throughout the present description that the expression "isocyanate" embraces any organic polyisocyanate compound having at least two free isocyanate groups suitable for use in the above applications such as foam applications. Suitable polyisocyanates include, without limitation, toluene-2,4-diisocyanate, 2,2,4-trimethylhexamethylene-1,6-diisocyanate, hexamethylene-1,6-diisocyanate, diphenylmethane-4,4-diisocyanate, triphenylmethane-4,4', 4''-triisocyanate, polymethylene polyphenylisocyanate, m-phenylene diisocyanate, p-phenylene diisocyanate, 2,6-toluene diisocyanate, 1,5-naphthalene diisocyanate, naphthalene-1,4-diisocyanate, dipheny lene-4,4'-diisocyanate,1, 4-cyclohexylene dimethylene diisocyanate, xylene-1,4-diisocyanate, xylene-1,3-diisocyanate, cyclohexyl-1,4-diisocyanate, 4,4'-methylene-bis(cyclohexyl isocyanate), 3,3'dimethyldiphenylmethane-4,4'-diisocyanate, isophorone diisocyanate, m-tetramethyl xylene diisocyanate, the product obtained by reacting trimethylol propane and 2,4-toluene diisocyanate in a ratio of 1:3, isocyanurate and biuret adducts of hexamethylene-1,6-diisocyanate and the like. Preferred isocyanates are methylene-bridged polyphenol polyisocyanates and mixtures thereof with crude diphenylmethane diisocyanate.

It is intended throughout the present description that the term solubility parameter refers to a property, represented by δ, used within the art of organic, physical and polymer chemistry to describe the solubility of organic compounds in other organic compounds or solvents. Calculate δ from fragment contributions to molecular structure published in the art. [see for example, Handbook of Solubility Parameters and other Cohesion Parameters, Barten, A., CRC Press, Florida (1984) and Properties of Polymers: their Estimation and Correlation with Chemical Structure, van Krevelen, D. W.; Hoftijzer, P. J., Elsevier, Amsterdam 2nd. Edn (1976)]. Also explained in the above references are methods to calculate values for the average solubility parameter of a mixture of liquids from known solubility parameter values of the constituent liquids in that mixture.

According to preferred embodiment of the first aspect of the present invention the composition in the form of a dispersion, comprises one or more dispersants, and alkoxylated lignin, preferably alkaline lignin, wherein said lignin, when dispersed in dispersant(s) of claim 1 has an average particle size of from about 100 nm to about 2000 nm, preferably in a range from about 100 to about 1000 nm, most preferred from about 200 to about 600 nm.

According to preferred embodiment of the first aspect of the present invention a composition according to claim 1 in the form of a lignin polyol.

According to preferred embodiment of the first aspect of the present invention said alkoxylated lignin is produced by selective alkoxylation of said lignin dispersed in said dispersant and or a mixture of said dispersants, preferably at a concentration of from 0.000001 to 80%, more preferred from 10 to 60% and most preferred from 20 to 40% on dry weight basis, wherein preferably more than 90% of the alkoxide has reacted with available phenolic hydroxyl groups in said lignin.

According to preferred embodiment of the first aspect of the present invention said lignin is a Kraft lignin.

According to preferred embodiment of the first aspect of the present invention said dispersant is a polyol and or a mixture of polyols.

According to preferred embodiment of the first aspect of the present invention said polyol is diethylene glycol, tetraethylene glycol, propoxylated glycerol, ethoxylated pentaerythritol, diethlene glycol, PEG400 or a mixture thereof.

According to preferred embodiment of the first aspect of the present invention said composition also comprises one or more flame retarding agents, preferably TCPP or DEEP or a combination of both.

According to preferred embodiment of the second aspect of the present invention said catalyst is an alkaline metal hydroxide, such as potassium hydroxide, sodium hydroxide, or an earth alkaline metal hydroxide such as magnesium hydroxide, barium hydroxide and calcium hydroxide, or a tertiary amine such as trimethylamine.

According to preferred embodiment of the second aspect of the present invention said alkoxide is ethylene oxide, propylene oxide, butylene oxide or 2,3-epoxy-1-propanol.

According to preferred embodiment of the second aspect of the present invention said temperature is in the range of 20-80° C., more preferably 30-60° C. and most preferably 40-50° C.

According to preferred embodiment of the second aspect of the present invention also one or more flame-retarding agents, preferably tris (1-chloro-2-propyl) phosphate (TCPP) or diethyl ethylphosphonate (DEEP) or a combination of both, is added.

According to preferred embodiment of the fifth aspect of the present invention said one or more additives may be selected from the group consisting of one or more surfactants, preferably one or more polydimethylsiloxane co-polymers, one or more polyurethane catalysts, preferably one or more tertiary amines or one or more triamines, one or more trimerization catalysts, one or more flame retarding agents, or combinations thereof.

According to preferred embodiment of the fifth aspect of the present invention said one or more blowing agents are one or more hydrocarbon compounds, preferably selected from i-pentane, n-pentane and cyclopentane, hydrofluorocarbons, methylal and/or methyl formate or a combination thereof;

According to preferred embodiment of the fifth aspect of the present invention one or more hydroxyl-containing compounds and/or one or more catalysts are added before addition of said one or more blowing agents, preferably one or more polyester polyols and/or one or more polyether polyols and as a catalyst a trimerization catalyst are added.

The composition may also have a maximum lignin content of 60% (by weight) whereas the dispersant polyol I may have a functionality between 2 and 6 isocyanate reactive groups per molecule, a calculated solubility parameter between 18 and 30 $MPa^{1/2}$ and a viscosity lower than 5 000 MPa·s at room temperature. A non-exhaustive list of typical alkoxides used in the production process comprises ethylene oxide, propylene oxide, butylene oxide and 2,3-epoxy-1-propanol.

The lignin polyol production process is further defined by reaction temperatures which may be between 40 and 100° C. and polyalkoxide-diol content (hereafter termed homopolymer) and/or capping of terminal hydroxyls of the dispersing polyol which may be less than 50% (by weight), more preferred less than 20% (by weight) and most preferred less than 10% (by weight).

Preferred features of each aspect of the invention are as for each of the other aspects mutatis mutandis. The prior art documents mentioned herein are incorporated to the fullest extent permitted by law. The invention is further described in the following examples in connection with the appended figures, which do not limit the scope of the invention in any way. Embodiments of the present invention are described as mentioned in more detail with the aid of examples of embodiments the only purpose of which is to illustrate the invention and are in no way intended to limit its extent.

FIGURES

FIG. 1. shows $^{13}$C-NMR spectrum of pure PEG400 dispersant from Example 1.

FIG. 2. shows $^{13}$C-NMR spectrum of isolated PEG400 dispersant after polyol synthesis in Example 1.

FIG. 3. shows $^1$H-NMR spectrum of pure (a) and isolated (b) diethylene glycol dispersant used in Example 2.

FIG. 4. shows $^1$H-NMR spectrum of pure (a) and isolated (b) diethylene glycol dispersant from polyol synthesis described in Example 2.

FIG. 5. shows $^1$H-NMR spectrum of isolated tetraethylene glycol from polyol synthesis described in Example 3.

FIG. 6. shows $^{13}$C-NMR spectrum of isolated PEG400 dispersant after polyol synthesis described in Example 6.

FIG. 7. shows $^{13}$C-NMR spectrum of isolated PEG400 dispersant after polyol synthesis described in Example 7.

FIG. 8. shows $^{13}$C-NMR spectrum of pure (a) and isolated (b) glycerol propoxylate dispersant from polyol synthesis described in Example 8.

FIG. 9. shows $^{13}$C-NMR spectrum of glycidol homopolymer isolated from a reaction of glycidol in the presence of KOH.

FIG. 10. shows $^{13}$C-NMR spectrum of isolated dispersant polyol PEG400 from polyol synthesis described in Example 10.

EXAMPLES

Example 1

28.5 parts of Kraft lignin was dispersed in 80 parts PEG400 (polyethylene glycol with Mn 400 Da, obtained from Sigma-Aaldrich) and 1.4 parts potassium hydroxide. The dispersion was heated under vacuum to 120-130° C. to remove excess water. After complete removal of water, the dispersion temperature was dropped to 40-50° C. 19 parts propylene oxide (obtained from Sigma-Aaldrich) was added continuously to the dispersion and the reaction proceeded for 18 h.

After completion of the reaction, 1.5 parts glacial acetic acid (100%) was added in an equimolar amount to the potassium hydroxide. The mixture was heated to 100° C. and stirred for 1 h.

The lignin polyol was further characterized through isolation of the alkoxylated lignin and the dispersant as described below;
1. The alkoxylated lignin was precipitated (by addition of 2M HCl and deionized H$_2$O) followed by filtration yielding a solid retentate consisting of the alkoxylated lignin and a liquid filtrate consisting of the dispersant and dionized H$_2$O.
2. The filtrate was freeze-dried to remove excess water.
3. The isolated alkoxylated lignin was washed with deionized water until the washing liquid pH stabilized. It was subsequently freeze-dried to remove all excess water.

The isolated dispersant was dissolved in CDCl$_3$ or DMSO-d6 (depending on the solubility) and analyzed at room temperature on a Bruker Avance 400 MHz spectrometer. Quantitative $^{13}$C-NMR and $^1$H-NMR spectra were collected collected with inverse gated decoupling pulse sequence with 30° pulse angle, delay of 6 s and 2 k scans. The $^{31}$P-NMR spectra were acquired using inverse gated decoupling pulse sequence with 90° pulse angle, delay of 6 s and 256 scans.

Quantification of the degree of homopolymer formation and/or propylene oxide capping of the dispersant was conducted using the $^{13}$C-NMR spectrum (FIG. 2). By setting the integral area of the backbone carbons at 70 ppm to 14 (assuming 7 repeating methylene units in the PEG400 backbone), the integral area of the group peaks at 18 ppm is obtained. This peak is distinctive for the methyl group of the propylene oxide. Presence of this group indicates either that homopolymers are formed or that propylene oxide capping of terminal hydroxyls of the dispersing polyol has occurred. Assuming a full propylene oxide capping of the dispersant polyol, this integral area is expected to have value of 2 (one methyl group per hydroxyl group of PEG400). Dividing this integral area with 6 yields the percentage of dispersant capped by propylene oxide. The obtained value was 6.5%. The terminal methylene carbons assigned as "a" and "b" retain their shift and sum of area of close to 2 (as compared to the $^{13}$C-spectrum of the pure dispersant, FIG. 1) indicating that capping has indeed occurred on the terminal hydroxyls.

The isolated alkoxylated lignin were further characterized through complete phosphitylation with 2-chloro-4,4,5,5-tetramethyl-1,3,2-dioxaphospholane (TMDP) followed by $^{31}$P-NMR analysis using endo-N-hydroxy-5-norbornene-2,3-dicarboximide (e-HNDI) as an internal standard to quantify the amount of phopsphitylated hydroxyls as described elsewhere [17]. The results are listed in.

Example 2

50 parts of Kraft lignin was dispersed in 70 parts diethylene glycol (obtained from Sigma-Aaldrich) and 2.5 parts potassium hydroxide. The dispersion was heated under vacuum to 120-130° C. to remove excess water. After complete removal of water, the dispersion temperature was dropped to 40-50° C. 32.8 parts propylene oxide (obtained from Sigma-Aaldrich) was added continuously to the dispersion and the reaction proceeded for 18 h.

After completion of the reaction, 2.6 parts glacial acetic acid (100%) was added in an equimolar amount to the potassium hydroxide. The mixture was heated to 100° C. and stirred for 1 h.

The dispersant and alkoxylated lignin were separated as described in Example 1 and further characterized individually by $^1$H-NMR, $^{13}$C-NMR and $^{31}$P-NMR as described in Example 1. $^1$H-NMR analysis of the isolated dispersant showed no capping of the terminal hydroxyls (FIGS. 3, 4).

Example 3

40 parts of Kraft lignin was dispersed in 70 parts tetraethylene glycol (obtained from Sigma-Aaldrich) and 2 parts potassium hydroxide. The dispersion was heated under vacuum to 120-130° C. to remove excess water. After complete removal of water, the dispersion temperature was dropped to 40-50° C. 26.2 parts propylene oxide (obtained from Sigma-Aaldrich) was added continuously to the dispersion and the reaction proceeded for 18 h.

After completion of the reaction, 2 parts glacial acetic acid (100%) was added in an equimolar amount to the potassium hydroxide. The mixture was heated to 100° C. and stirred for 1 h.

The dispersant and alkoxylated lignin were separated as described in Example 1 and further characterized individually by $^1$H-NMR, $^{13}$C-NMR and $^{31}$P-NMR as described in Example 1. The degree of conversion of the terminal hydroxyls on the dispersant polyol was calculated using the collected $^1$H-NMR spectrum (FIG. 5). Here, the integral area of the signals representing the backbone hydroxyls of tetraethylene glycol was set to 16 to obtain the integral area of the terminal methyl groups at 1.1-1 ppm. This group of peaks is characteristic for methyl protons indicating that either homopolymerisation on of propylene oxide has occurred or that capping of terminal hydroxyls of tetraethylene glycol by propylene oxide has occurred. Assuming full capping of the terminal hydroxyls of tetraethylene glycol, the theoretical value of this peak group is 6 (3 methyl protons per tetraethylene end group). Dividing the observed integral area signal of 0.36 with the theoretical value of 6 yields the degree of capping of terminal hydroxyls by propylene oxide. This value was 6% in this Example.

Example 4

22 parts of Kraft lignin was dispersed in 80 parts tetraethylene glycol and 1.1 parts potassium hydroxide. The dispersion was heated under vacuum to 120-130° C. to remove excess water. After complete removal of water, the dispersion temperature was dropped to 40-50° C. 7.2 parts propylene oxide (obtained from Sigma-Aaldrich) was added continuously to the dispersion and the reaction proceeded for 18 h.

After completion of the reaction, 0.6 parts glacial acetic acid (100%) was added in an equimolar amount to the potassium hydroxide. The mixture was heated to 100° C. and stirred for 1 h.

The dispersant and alkoxylated lignin were separated as described in Example 1 and further characterized individually by $^1$H-NMR, $^{13}$C-NMR and $^{31}$P-NMR as described in Example 1.

Example 5

20 parts of Kraft lignin was dispersed in 80 parts PEG400 (polyethylene glycol with Mn 400 Da, obtained from Sigma-Aaldrich) and 1 part sodium hydroxide. The dispersion was heated under vacuum to 120-130° C. to remove excess water. After completed removal of water, the dispersion temperature was dropped to 80° C. 13.6 parts propylene oxide (obtained from Sigma-Aaldrich) was added continuously to the dispersion and the reaction proceeded for 12 h.

After completion of the reaction, 1.5 parts glacial acetic acid (100%) was added in an equimolar amount to the potassium hydroxide. The mixture was heated to 100° C. and stirred for 1 h.

The dispersant and alkoxylated lignin were separated as described in Example 1 and further characterized individually by $^1$H-NMR, $^{13}$C-NMR and $^{31}$P-NMR as described in Example 1.

Example 6

20 parts of Kraft lignin was dispersed in 55 parts PEG400 (polyethylene glycol with Mn 400 Da, obtained from Sigma-Aaldrich) and 1.4 parts potassium hydroxide. The dispersion was heated under vacuum to 120-130° C. to remove excess water.

After completed removal of water, the dispersion temperature was dropped to 40° C. 7.8 parts propylene oxide (obtained from Sigma-Aaldrich) was added continuously to the dispersion and the reaction proceeded for 18 h.

After completion of the reaction, 1.5 parts glacial acetic acid (100%) was added in an equimolar amount to the potassium hydroxide. The mixture was heated to 100° C. and stirred for 1 h.

The dispersant and alkoxylated lignin were separated as described in Example 1 and further characterized individually by $^1$H-NMR, $^{13}$C-NMR and $^{31}$P-NMR as described in Example 1. The degree of capping by propylene oxide of the terminal hydroxyls on the dispersant polyol and/or propylene oxide homopolymer was calculated from the obtained $^{13}$C-NMR spectrum (FIG. 6) to 12.5% as described in Example 1 (Table 1).

The degree of conversion of phenolic to aliphatic hydroxyls in the isolated alkoxylated lignin was determined to 65% (Table 2).

Example 7

20 parts of Kraft lignin was dispersed in 55 parts PEG400 (polyethylene glycol with Mn 400 Da, obtained from Sigma-Aaldrich) and 1.4 parts potassium hydroxide. The dispersion was heated under vacuum to 120-130° C. to remove excess water.

After complete removal of water, the dispersion temperature was dropped to 40° C. 5.2 parts propylene oxide was added continuously to the dispersion and the reaction proceeded for 18 h.

After completion of the reaction, 1.5 parts glacial acetic acid (100%) was added in an equimolar amount to the potassium hydroxide. The mixture was heated to 100° C. and stirred for 1 h.

The dispersant and alkoxylated lignin were separated as described in Example 1 and further characterized individually by $^1$H-NMR, $^{13}$C-NMR and $^{31}$P NMR as described in Example 1. The degree of capping by propylene oxide of the terminal hydroxyls on the dispersant polyol and/or propylene oxide homopolymer was calculated from the obtained $^{13}$C-NMR spectrum (FIG. 7) to 4% as described in Example 1 (Table 1).

The degree of conversion of phenolic to aliphatic hydroxyls in the isolated alkoxylated lignin was determined to 53% (Table 2).

Example 8

20 parts of Kraft lignin was dispersed in 54 parts glycerol propoxylate (Average Mn ~266 obtained from Sigma-Aaldrich) and 1.4 parts potassium hydroxide. The dispersion was heated under vacuum to 120-130° C. to remove excess water. After complete removal of water, the dispersion temperature was dropped to 40° C. 13 parts propylene oxide was added continuously to the dispersion and the reaction proceeded for 18 h.

After completion of the reaction, 1.5 parts glacial acetic acid (100%) was added in an equimolar amount to the potassium hydroxide. The mixture was heated to 100° C. and stirred for 1 h.

The dispersant and alkoxylated lignin were separated as described in Example 1 and further characterized individually by $^1$H-NMR, $^{13}$C-NMR and $^{31}$P NMR as described in Example 1.

No conversion of terminal hydroxyls of the dispersant could be detected (FIG. 8).

The degree of conversion of phenolic to aliphatic hydroxyls in the isolated alkoxylated lignin was determined to 93% (Table 1).

Example 9

20 parts of Kraft lignin was dispersed in 55 parts PEG400 (polyethylene glycol with Mn 400 Da, obtained from Sigma-Aaldrich) and 1.4 parts potassium hydroxide. The dispersion was heated under vacuum to 120-130° C. to remove excess water. After complete removal of water, the dispersion temperature was dropped to 40° C. 17 parts 2,3-epoxy-1-propanol (obtained from Sigma-Aaldrich) was added continuously to the dispersion and the reaction proceeded for 18 h.

After completion of the reaction, 1.5 parts glacial acetic acid (100%) was added in an equimolar amount to the potassium hydroxide. The mixture was heated to 100° C. and stirred for 1 h.

The dispersant and alkoxylated lignin were separated as described in Example 1 and further characterized individually by $^1$H-NMR, $^{13}$C-NMR and $^{31}$P-NMR as described in Example 1. The degree of conversion of the terminal hydroxyls on the dispersant polyol was calculated as described below. Owing to the absence of a terminal methyl carbon in the glycidol structure, quantification of homopolymers presents a greater challenge as compared with the examples where propylene oxide was used.

To properly identify the relevant signal peaks corresponding to glycidol homopolymer and/terminal capped groups of the dispersant polyol, homopolymerization of pure glycidol initiated by H2O in the presence of KOH was performed. This reaction was performed at 40° C. overnight. The resulting homopolymer was isolated from the reaction mixture by removal of water through freeze-drying and analyzed with $^{13}$C-NMR as described in Example 1. The $^{13}$C-NMR spectrum of a glycidol homopolymer is presented in FIG. 9. Here, a set of peaks at 60, 63, 67, 70 and 73 ppm has been identified to originate from backbone and terminal methylene units of the glycidol homopolymer (FIG. 9). Of this set, the peak at 70 ppm is omitted from further quantification due to possible overlap with peaks from the dispersing polyol. The sum of the remaining peaks, setting the area of the peak at 60 ppm to 1 is 16. This number is used as the theoretical value of full conversion to glycidol homopolymer.

$^{13}$C-NMR spectrum of the isolated dispersant polyol PEG400 is presented in FIG. 10. Quantification of homopolymer amount was done by obtaining the areas of the peaks at 60, 63, 67 and 73 ppm (FIG. 10) setting the area of the signal representing the backbone methylene unit of the dispersant polyol to 14. Dividing the sum of these signals with 16 (the total area sum of corresponding peaks in the spectrum of pure glycidol homopolymer, FIG. 9) gives the yield of formed homopolymer. This value was calculated to 9.6%.

Capping of terminal hydroxyls of the dispersant polyol can in this instance be ruled out as it would result in a completely different spectrum with loss of terminal methylene carbon signals and the appearance of a tertiary carbon signal at 100 ppm and higher which was not observed in the collected spectrum.

The degree of conversion of phenolic to aliphatic hydroxyls in the isolated alkoxylated lignin was determined to 96% (Table 1).

Example 10

20 parts of Kraft lignin was dispersed in 43 parts diethylene glycol (obtained from Sigma-Aaldrich) and 1.4 parts potassium hydroxide. The dispersion was heated under vacuum to 120-130° C. to remove excess water. After complete removal of water, the dispersion temperature was dropped to 40° C. 17 parts 2,3-epoxy-1-propanol (obtained from Sigma-Aaldrich) was added continuously to the dispersion and the reaction proceeded for 18 h.

After completion of the reaction, 1.5 parts glacial acetic acid (100%) was added in an equimolar amount to the potassium hydroxide. The mixture was heated to 100° C. and stirred for 1 h.

The dispersant and alkoxylated lignin were separated as described in Example 1 and further characterized individually by 1H-NMR, 13C-NMR and 31-P NMR as described in Example 1.

No capping of the terminal hydroxyls of the dispersant polyol was observed by $^1$H- and $^{13}$C-NMR.

The degree of conversion of phenolic to aliphatic hydroxyls in the isolated alkoxylated lignin was determined to 98% (Table 1).

Example 11

20 parts of Kraft lignin was dispersed in 54 parts glycerol propoxylate (Average Mn ~266 obtained from Sigma-Aaldrich) and 1.4 parts potassium hydroxide. The dispersion was heated under vacuum to 120-130° C. to remove excess water. After complete removal of water, the dispersion temperature was dropped to 40° C. 13 parts propylene oxide was added continuously to the dispersion and the reaction proceeded for 18 h.

After completion of the reaction, 1.5 parts glacial acetic acid (100%) was added in an equimolar amount to the potassium hydroxide. The mixture was heated to 100° C. and stirred for 1 h.

The dispersant and alkoxylated lignin were separated as described in Example 1 and further characterized individually by $^1$H-NMR, $^{13}$C-NMR and $^{31}$P NMR as described in Example 1.

No capping of the terminal hydroxyls of the dispersant polyol was observed by $^1$H- and $^{13}$C-NMR.

The degree of conversion of phenolic to aliphatic hydroxyls in the isolated alkoxylated lignin was determined to 95% (Table Comparative Example 12 (not an Example of this Invention)

20 parts of Kraft lignin was dispersed in 73 parts glycerine (obtained from Sigma-Aaldrich) and 1.4 parts potassium hydroxide. The dispersion was heated under vacuum to 120-130° C. to remove excess water. After complete removal of water, the dispersion temperature was dropped to 40° C. 13 parts propylene oxide was added continuously to the dispersion and the reaction proceeded for 18 h.

After completion of the reaction, it was noted that significant precipitation had occurred yielding a non-successful or not complete lignin polyol synthesis reaction.

Comparative Example 13 (not an Example of this Invention)

20 parts of Kraft lignin was dispersed in 54 parts VORANOL™ CP105 (glycerine-propoxylate with an average Mn 1000 obtained from Dow Chemicals) and 1.4 parts potassium hydroxide. The dispersion was heated under vacuum to 120-130° C. to remove excess water. After completed removal of water, the dispersion temperature was dropped to 40° C. 13 parts propylene oxide was added continuously to the dispersion and the reaction proceeded for 18 h.

After completion of the reaction, it was noted that significant precipitation had occurred yielding a non-successful or not complete lignin polyol synthesis reaction.

Examples of Polyurethane Foams

The applicability of the invention is further demonstrated by Examples 14-38, comprising the preparation of polyurethane foams by handmix foaming (which thus was a discontinuous, batch-wise process). To this end, the compositions were prepared by weighing a target amount of lignin polyol from examples 1-11, followed by addition of all other polyol components and additives, except the blowing agent(s). The blowing agent was added last, using the Heidolph stirrer described below, just before mixing the polyol blend with Lupranate® M20S from BASF which was invariably used as PMDI. Handmix foams were prepared using a Heidolph lab. stirrer fitted with timer and rpm counter as follows. After preparing the polyol blends in a carboard beaker, a weighed amount of Lupranate® M20S was poured in the beaker. Subsequently, the mixture was stirred for 10 seconds at 4000 rpm, after which the reacting mass was poured into a 20×20×20 cm$^3$ cardboard box where it was allowed to rise freely and cure. Nucleation was recorded in the usual way by visually inspecting the transition to a creamy mass in the box (cream time). The fully developed foam was then probed by a disposable (wooden) spatula to check the formation of strings in the foaming mass. The first appearance of these strings was recorded as 'string time'. Finally, the same spatula was used to test 'tackiness' of the fully risen foam. The first disappearance of tackiness was recorded as 'tack free' time. Polyurethane (PUR) foams were selected as the first target to demonstrate the capabilities of the invention which is however not limited to this particular application.

Formulations used and reactivities of the foams are given by Tables 3-5.

Voranol™ RN490 is a sucrose/glycerine initiated polyol from Dow. 2145 is a toluene diamine-initiated polyol obtained from System House SPRL. POLSIL® is a surfactant obtained from System House SPRL. Stepan™ PS2412 is an aromatic polyester polyol obtained from Stepan.

Lupraphen® 3905/1 is an aromatic polyester polyol obtained from BASF. TEGOAMIN® PMDETA and TEGOAMIN® DMCHA are tertiary amine catalysts obtained from Evonik. KOSMOS® 33 is a potassium acetate catalyst obtained from Evonik. TEGOSTAB® 8491, 8433 and 8476 are silicone surfactants obtained from Evonik. TCPP (Tris (1-chloro-2-propyl) phosphate) is a flame retardant obtained from System House SPRL.

Lupranate® M20S is a polymeric MDI obtained from BASF.

Tables

TABLE 1

Functional group composition of isolated alkoxylated lignin from Examples 1-18

| Isolated alkoxylated lignin | Aliphatic OH (mmol/g) | New aliphatic - OH (mmol/g) | Phenolic - OH (mmol/g) | Conversion phenolic to aliphatic hydroxyls (%) |
|---|---|---|---|---|
| Reference lignin | 2.23 | 0.00 | 4.81 | — |
| Example 1 | 1.87 | 3.51 | 0.17 | 96% |
| Example 3 | 3.09 | 3.24 | 0.11 | 98% |
| Example 4 | 2.51 | 3.51 | 0.30 | 94% |
| Example 5 | 1.84 | 3.42 | 0.23 | 95% |
| Example 6 | 2.36 | 1.71 | 1.68 | 65% |
| Example 7 | 2.03 | 2.04 | 2.27 | 53% |
| Example 8 | 1.90 | 4.89 | 0.32 | 93% |
| Example 9 | 5.14 | 3.45 | 0.19 | 96% |
| Example 10 | 5.71 | 3.43 | 0.11 | 98% |
| Example 11 | 4.80 | 3.53 | 0.23 | 95% |
| Example 12 | 2.17 | 1.77 | 2.90 | 40% |
| Example 13 | 2.13 | 1.64 | 2.68 | 48% |

TABLE 2

Calculated solubility parameter δ and degree of homopolymer formation and/or terminal hydroxyl capping of dispersing polyols used in Examples 1-14.

| Example nr. | Dispersing polyol | Calculated solubility parameter δ | Lignin concentration (%), Reaction temperature (° C.) and oxide species (PO or GL) | Degree of homopolymer formation and/or terminal capping |
|---|---|---|---|---|
| 1 | PEG400 | 21.07 | 25% 40° C. PO | 6.5% |
| 2 | DEG | 24.60 | 40% 40° C. PO | Not detected |
| 3 | TEG | 23.87 | 35% 40° C. PO | 6% |
| 4 | TEG | 23.87 | 20% 40° C. PO | Not determined |
| 5 | PEG400 | 21.07 | 25% 80° C. PO | Not determined |
| 6 | PEG400 | 21.07 | 25% 40° C. PO 1.5 | 12.5% |
| 7 | PEG400 | 21.07 | 25% 40° C. PO 1.0 | 4% |
| 8 | CP266 | 21.95 | 25% 40° C. PO | Not detected |
| 9 | PEG400 | 21.07 | 25% 40° C. GL | 9.5% |
| 10 | DEG | 24.60 | 25% 40° C. GL | Not detected |
| 11 | CP266 | 21.95 | 25% 40° C. GL | Not detected |
| 12 | Glycerol | 37.77 | 25% 40° C. GL | Not determined |
| 13 | CP1055 | 17.87 | 25% 40° C. GL | Not determined |

TABLE 3

Formulations and reactivities for cyclopentane blown polyurethane (PUR) foams

| | Example nr. | 14 | 15 | 16 | 17 | 18 | 19 | 20 | 21 | 21 | 22 | 23 | 24 |
|---|---|---|---|---|---|---|---|---|---|---|---|---|---|
| Polyols | Stepan PS2412 | 24.02 | | 24.02 | | 24.04 | | | | | | 24.09 | |
| | Voranol ® RN490 | | 48.03 | | 48.05 | | 48.05 | 48.03 | 48.03 | 48.08 | 48.02 | | 48.03 |
| | Z145 | 8.06 | 8.03 | 8.36 | 8.05 | 8.00 | 8.05 | 8.03 | 8.03 | 8.00 | 8.03 | 8.07 | 8.00 |
| | Polyol from Example 1 | 61.98 | 22.38 | | | | | | | | | | |
| | Polyol from Example 2 | | | 58.97 | 20.89 | | | | | | | | |

TABLE 3-continued

Formulations and reactivities for cyclopentane blown polyurethane (PUR) foams

|  |  | 14 | 15 | 16 | 17 | 18 | 19 | 20 | 21 | 21 | 22 | 23 | 24 |
|---|---|---|---|---|---|---|---|---|---|---|---|---|---|
|  | Polyol from Example 3 |  |  |  |  | 57.47 | 21.33 |  |  |  |  |  |  |
|  | Polyol from Example 6 |  |  |  |  |  |  | 23.16 |  |  |  |  |  |
|  | Polyol from Example 7 |  |  |  |  |  |  |  | 23.81 |  |  |  |  |
|  | Polyol from Example 9 |  |  |  |  |  |  |  |  | 15.92 |  |  |  |
|  | Polyol from Example 10 |  |  |  |  |  |  |  |  |  | 19.92 |  |  |
|  | Polyol from Example 11 |  |  |  |  |  |  |  |  |  |  | 44.34 | 15.54 |
| Additives | TEGOAMIN ® PMDETA | 0.08 | 0.11 | 0.07 | 0.10 | 0.11 | 0.10 | 0.12 | 0.11 | 0.22 | 0.21 | 0.22 | 0.22 |
|  | TEGOAMIN ® DMCHA | .051 | 0.61 | 0.51 | 1.00 | 0.75 | 1.00 | 1.00 | 0.99 | 1.01 | 1.01 | 1.02 | 1.00 |
|  | POLSIL ® | 2.03 | 2.02 | 2.01 | 2.03 | 2.01 | 2.03 | 2.01 | 2.00 | 2.01 | 2.01 | 2.03 | 2.00 |
|  | H₂O | 1.51 | 1.51 | 1.51 | 1.51 | 1.51 | 1.50 | 1.54 | 1.49 | 1.53 | 1.53 | 1.55 | 1.51 |
| Blowing agents | Cyclopentane | 14.02 | 14.05 | 14.11 | 14.09 | 14.14 | 14.09 | 14.11 | 14.28 | 14.08 | 14.00 | 14.36 | 14.15 |
| Isocyanate | Lupranate ® M20S pMDI | 106.16 | 122.44 | 109.32 | 121.71 | 110.33 | 121.71 | 121.05 | 120.61 | 127.85 | 124.03 | 124.39 | 128.12 |
|  | Isocyanate Index | 1.2 | 1.18 | 1.20 | 1.19 | 1.20 | 1.19 | 1.19 | 1.20 | 1.20 | 1.20 | 1.20 | 1.20 |
| Reactivities | Cream time (s) | 9 | 17 | 21 | 16 | 12 | 13 | 12 | 12 | 13 | 20 | 18 | 17 |
|  | String time (s) | 20 | 79 | 48 | 56 | 20 | 53 | 69 | 52 | 90 | 101 | 119 | 157 |
|  | Tack free time (s) | 31 | 120 | 57 | 60 | 25 | 67 | 93 | 79 | 114 | 137 | 135 | 167 |
| Mechanical properties | Cstr.//(kPa) | 115 | 178 | 101 | 85 | 95 | 154 | 144 | 130 | 157 | 106 | 87 | 83 |
|  | Cstr⊥(kPa) | 40 | 63 | 61 | 57 | 37 | 47 | 43 | 48 | 34 | 20 | 20 | 14 |
|  | Density (kg/m3) | 21.7 | 23.6 | 23.9 | 22.3 | 20.6 | 23.6 | 25.3 | 23.6 | 23.8 | 26.8 | 33.7 | 27.4 |

TABLE 4

Formulations and reactivities for water-blown polyurethane (PUR) foams.

|  | Example nr. | 25 | 26 | 27 | 28 | 29 | 30 | 31 | 32 | 33 | 34 |
|---|---|---|---|---|---|---|---|---|---|---|---|
| Polyols | Stepan PS2412 | 44.41 |  | 44.44 |  | 44.049 |  | 44.16 |  |  |  |
|  | RN490 |  | 40.03 |  | 40.08 |  | 40.07 |  | 40.08 | 40.02 | 40.03 |
|  | Z145 | 10.02 | 10.04 | 10.02 | 10.03 | 10.06 | 10.07 | 10.02 | 10.02 | 10.02 | 10.04 |
|  | Polyol from Example 1 | 51.67 | 40.24 |  |  |  |  |  |  |  |  |
|  | Polyol from Example 2 |  |  | 49.04 | 38.47 |  |  |  |  |  |  |
|  | Polyol from Example 3 |  |  |  |  | 47.80 | 37.37 |  |  |  |  |
|  | Polyol from Example 9 |  |  |  |  |  |  | 37.97 | 29.33 |  |  |
|  | Polyol from Example 10 |  |  |  |  |  |  |  |  | 36.51 |  |
|  | Polyol from Example 11 |  |  |  |  |  |  |  |  |  | 28.49 |
| Additives | TEGOAMIN ® PMDETA | 0.06 | 0.1 | 0.06 | 0.06 | 0.06 | 0.06 | 0.11 | 0.07 | 0.10 | 0.11 |
|  | TEGOAMIN ® DMCHA | 0.53 | 1.00 | 0.51 | 0.51 | 0.51 | 0.52 | 1.01 | 0.53 | 1.00 | 1.01 |
|  | POLSIL ® | 2.02 | 2.03 | 2.04 | 2.00 | 2.03 | 2.00 |  |  |  |  |
|  | TEGOSTAB ™ B8433 |  |  |  |  |  |  | 2.09 | 2.04 | 2.01 | 2.05 |
|  | KOSMOS ® 33 | 1.63 | 1.61 | 0.50 | 0.53 | 0.51 | 0.51 |  |  |  |  |
| Blowing agents | H₂O | 4.51 | 4.00 | 4.00 | 4.06 | 4.02 | 4.02 | 4.00 | 4.02 | 4.03 | 4.02 |
| Isocyanate | Lupranate ® M20S pMDI | 166.15 | 173.04 | 159.91 | 176.55 | 161.46 | 176.62 | 170.59 | 183.73 | 176.58 | 184.63 |
|  | Isocyanate Index | 1.20 | 1.20 | 1.20 | 1.20 | 1.20 | 1.20 | 1.20 | 1.20 | 1.20 | 1.20 |
| Reactivities | Cream time (s) | 12 | 10 | 18 | 20 | 14 | 15 | 12 | 17 | 15 | 17 |
|  | String time (s) | 20 | 23 | 35 | 56 | 26 | 37 | 24 | 86 | 52 | 80 |
|  | Tack free time (s) | 25 | 29 | 38 | 59 | 27 | 42 | 33 | 90 | 67 | 90 |
| Mechanical properties | Cstr.//(kPa) | 142 | 173 | 169 | 152 | 154 | 152 | 118 | 220 | 118 | 166 |
|  | Cstr⊥(kPa) | 40 | 62 | 43 | 63 | 29 | 54 | 35 | 89 | 63 | 59 |
|  | Density (kg/m3) | 23.5 | 28.5 | 27.5 | 29.4 | 27.3 | 28.2 | 24.5 | 31.1 | 28.9 | 31.1 |

TABLE 5

Formulations and reactivities for polyisocyanate (PIR) foams.

| | Example nr. | 35 | 36 | 37 | 38 |
|---|---|---|---|---|---|
| Polyols | Lupraphen ® 3905/1 | 28.18 | 31.26 | 30.65 | 26.12 |
| | Polyol from Example 1 | 28.17 | | | |
| | Polyol from Example 2 | | 31.21 | | |
| | Polyol from Example 3 | | | 30.64 | |
| | Polyol from Example 11 | | | | 26.11 |
| Additives | TEGOAMIN ® PMDETA | 0.20 | 0.20 | 0.20 | 0.42 |
| | TEGOSTAB ™ B8476 | 2.00 | 2.00 | 2.00 | 2.00 |
| | KOSMOS ® 33 | 3.00 | 3.00 | 3.00 | 3.00 |
| | TCPP | 14.00 | 14.00 | 14.00 | 14.00 |
| | $H_2O$ | 1.30 | 0.65 | 0.65 | 0.65 |
| Blowing agents | Cyclopentane | 9.59 | 12.12 | 12.23 | 12.24 |
| Isocyanate | Lupranate ® M20S pMDI | 144.45 | 136.54 | 137.72 | 146.59 |
| | Isocyanate Index | 2.60 | 2.60 | 2.60 | 2.60 |
| Reactivities | Cream time (s) | 9 | 27 | 13 | 33 |
| | String time (s) | 18 | 47 | 29 | 83 |
| | Tack free time (s) | 20 | 56 | 34 | 90 |
| Mechanical properties | Cstr.//(kPa) | 102 | 114 | 120 | 174 |
| | Cstr⊥(kPa) | 37 | 47 | 27 | 47 |
| | Density (kg/m3) | 24.5 | 29.3 | 36.0 | 29.5 |

In view of the above detailed description of the present invention, other modifications and variations will become apparent to those skilled in the art. However, it should be apparent that such other modifications and variations may be effected without departing from the spirit and scope of the invention.

CITED LITERATURE

1. Hsu, O. H. H. and W. G. Glasser, *Polyurethane adhesives and coatings from modified lignin*. Wood Science, 1976. 9(2): p. 97-103.
2. Glasser W, G., et al., *Lignin-Derived Polyols, Polyisocyanates, and Polyurethanes*, in Urethane Chemistry and Applications 1981, AMERICAN CHEMICAL SOCIETY. p. 311-338.
3. Glasser, W. G., et al., *Engineering plastics from lignin II. Characterization of hydroxyalkyl lignin derivatives*. Journal of Applied Polymer Science, 1984. 29(5): p. 1815-1830
4. Saraf, V. P. and W. G. Glasser, *Engineering plastics from lignin. III. Structure property relationships in solution cast polyurethane films*. Journal of Applied Polymer Science, 1984. 29(5): p. 1831-1841.
5. Wu, L. C. F. and W. G. Glasser, *Engineering plastics from lignin. I. Synthesis of hydroxypropyl lignin*. Journal of Applied Polymer Science, 1984. 29(4): p. 1111-1123.
6. Saraf, V. P., W. G. Glasser, and G. L. Wilkes, *Engineering plastics from lignin. VII. Structure property relationships of poly(butadiene glycol)-containing polyurethane networks*. Journal of Applied Polymer Science, 1985. 30(9): p. 3809-3823.
7. Saraf, V. P., et al., *Engineering plastics from lignin. VI. Structure-property relationships of PEG-containing polyurethane networks*. Journal of Applied Polymer Science, 1985. 30(5): p. 2207-2224.
8. Kelley, S. S., W. G. Glasser, and T. C. Ward, *Engineering plastics from lignin. XV. Polyurethane films from chain-extended hydroxypropyl lignin*. Journal of Applied Polymer Science, 1988. 36(4): p. 759-772.
9. Cateto, C. A., et al., *Optimization Study of Lignin Oxypropylation in View of the Preparation of Polyurethane Rigid Foams*. Industrial & Engineering Chemistry Research, 2009. 48(5): p. 2583-2589.
10. Cateto, C. A., et al. *Oxypropylation of lignins and characterization of the ensuing polyols*. in 8th ILI Forum. 2007. Rome: ILI—The International Lignin Institute.
11. Gandini, A., et al., *Lignins as Macromonomers for Polyesters and Polyurethanes*, in Chemical Modification, Properties, and Usage of Lignin, T. Hu, Editor 2002, Springer US. p. 57-80.
12. Nadji, H., et al., *Oxypropylation of Lignins and Preparation of Rigid Polyurethane Foams from the Ensuing Polyols*. Macromolecular Materials and Engineering, 2005. 290(10): p. 1009-1016.
13. Li, Y. and A. J. Ragauskas, *Kraft Lignin-Based Rigid Polyurethane Foam*. Journal of Wood Chemistry and Technology, 2012. 32(3): p. 210-224.
14. Xue, B.-L., et al., *Polyols production by chemical modification of autocatalyzed ethanol-water lignin from Betula alnoides*. Journal of Applied Polymer Science, 2013. 129(1): p. 434-442.
15. Arshanitsa, A., L. Vevere, and G. Telysheva. *The effect of alkali catalyst content and water content in organosolve wheat straw lignin on process of it oxypropylation and characteristics of lignopolyols obtained*. in Baltic Polymer Symposium (BPS). 2013. Trakai, Lithuania.
16. Arshanitsa, A., et al. *Two Approaches of Introduction of Wheat Straw Lignin in Rigid Polyurethane Foams*. in 29th International Conference of the POLYMER PROCESSING SOCIETY (PPS 29). 2013. Nuremberg, Germany.
17. King, A. W. T., et al., *In Situ Determination of Lignin Phenolics and Wood Solubility in Imidazolium Chlorides Using 31P NMR*. Journal of Agricultural and Food Chemistry, 2009. 57(18): p. 8236-8243.

The invention claimed is:

1. A composition in the form of a dispersion, comprising: one or more dispersants, and
alkoxylated lignin,
wherein said dispersants have a solubility parameter of from about 18 to about 30 MPa $^{1/2}$, an average functionality of dispersant or dispersant mixture between 2 and 6 isocyanate reactive groups per molecule, and a viscosity of the dispersant or dispersant mixture lower than 5 000 Mpa·s at room temperature,
wherein said dispersant comprises a polyol selected from the group consisting of: diethylene glycol, tetraethylene glycol, propoxylated glycerol, ethoxylated pentaerythritol, diethlene gylcol, PEG400 and mixture thereof,
and wherein the composition further comprises a catalyst, and wherein all of the catalyst is neutralized.

2. A composition according to claim 1, wherein said lignin, when dispersed in dispersant(s) of claim 1 has an average particle size of from about 100 nm to about 2000 nm.

3. A composition according to claim 1 in the form of a lignin polyol.

4. A composition according to claim 1, wherein said lignin includes available phenolic hydroxyl groups and wherein said alkoxylated lignin is produced by selective alkoxylation of said lignin dispersed in said dispersant and or a mixture of said dispersants, at a concentration of from 0.000001 to 80% on dry weight basis, with an alkoxide, and wherein more than 50% of the alkoxide has reacted with the available phenolic hydroxyl groups in said lignin.

5. A composition according to claim 1 wherein said lignin is a Kraft lignin.

6. A composition according to claim 1 also comprising one or more flame retarding agents.

7. A composition according to claim 1, wherein the alkoxylated lignin is an alkaline lignin.

* * * * *